United States Patent
Ma et al.

(10) Patent No.: US 11,824,361 B2
(45) Date of Patent: Nov. 21, 2023

(54) CONTROL METHOD AND SYSTEM FOR DISTRIBUTION NETWORK WITH DISTRIBUTED MOBILE ENERGY STORAGE SYSTEMS

(71) Applicants: Electric Power Science & Research Institute of State Grid Tianjin Electric Power Company, Tianjin (CN); State Grid Tianjin Electric Power Company, Tianjin (CN); State Grid Corporation of China, Beijing (CN)

(72) Inventors: Shiqian Ma, Tianjin (CN); Yi Ding, Tianjin (CN); Xuejun Shang, Tianjin (CN); Guodong Li, Tianjin (CN); Xianxu Huo, Tianjin (CN); Tianchun Xiang, Tianjin (CN); Xudong Wang, Tianjin (CN); Tianhao Wang, Tianjin (CN); Lei Wu, Tianjin (CN)

(73) Assignees: Electric Power Science & Research Institute of State Grid Tianjin Electric Power Company, Tianjin (CN); State Grid Tianjin Electric Power Company, Tianjin (CN); State Grid Corporation of China, Beijing (CN)

( * ) Notice: Subject to any disclaimer, the term of this patent is extended or adjusted under 35 U.S.C. 154(b) by 561 days.

(21) Appl. No.: 17/049,570

(22) PCT Filed: May 29, 2020

(86) PCT No.: PCT/CN2020/093164
§ 371 (c)(1),
(2) Date: Oct. 22, 2020

(87) PCT Pub. No.: WO2020/239057
PCT Pub. Date: Dec. 3, 2020

(65) Prior Publication Data
US 2023/0110198 A1    Apr. 13, 2023

(30) Foreign Application Priority Data

May 31, 2019    (CN) .......................... 201910468167.3

(51) Int. Cl.
*H02J 3/28*    (2006.01)
*H02J 3/46*    (2006.01)
(Continued)

(52) U.S. Cl.
CPC ................ *H02J 3/28* (2013.01); *H02J 3/381* (2013.01); *H02J 3/466* (2020.01); *H02J 13/00002* (2020.01)

(58) Field of Classification Search
CPC .... H02J 3/28; H02J 3/381; H02J 3/466; H02J 13/00002; H02J 13/00004; Y02E 60/00; G06Q 10/06315
See application file for complete search history.

(56) References Cited

U.S. PATENT DOCUMENTS

| | | | | |
|---|---|---|---|---|
| 2007/0006586 | A1* | 1/2007 | Hoffman | F02C 6/16 60/641.2 |
| 2010/0217642 | A1* | 8/2010 | Crubtree | G06Q 10/00 726/4 |

(Continued)

FOREIGN PATENT DOCUMENTS

| | | |
|---|---|---|
| CN | 102738815 A | 10/2012 |
| CN | 106026192 A | 10/2016 |

(Continued)

*Primary Examiner* — Ziaul Karim

(57) ABSTRACT

A control method and system for a distribution network with distributed mobile energy storage systems is disclosed which relates to the power field. The present invention manages the multiple distributed mobile energy storage systems in the distribution network in a unified way, to improve the flexibility of the distribution network, and enable the distributed mobile energy storage systems to fully smooth new energy generation fluctuations, implement peak (Continued)

cut, facilitate grid auxiliary services, and improve the power quality. The control method includes: acquiring, by a sub-station coordination system, data of the distributed mobile energy storage systems; receiving, by a master-station dispatching system, the data of the distributed mobile energy storage systems, and obtaining external data; generating, by the master-station dispatching system, a control instruction; and controlling, by the sub-station coordination system, the distributed mobile energy storage systems. The control system includes the master-station dispatching system and the sub-station coordination systems.

5 Claims, 2 Drawing Sheets

(51) Int. Cl.
*H02J 13/00* (2006.01)
*H02J 3/38* (2006.01)

(56) References Cited

U.S. PATENT DOCUMENTS

| | | | | |
|---|---|---|---|---|
| 2011/0208366 | A1* | 8/2011 | Taft | H04L 63/0227 340/5.32 |
| 2012/0072039 | A1* | 3/2012 | Anderson | G06Q 10/04 700/297 |
| 2015/0066231 | A1* | 3/2015 | Clifton | H02J 3/381 307/46 |
| 2016/0258361 | A1* | 9/2016 | Tiwari | G06Q 50/06 |
| 2018/0024205 | A1* | 1/2018 | Kim | H02J 13/00006 700/293 |

FOREIGN PATENT DOCUMENTS

| | | | |
|---|---|---|---|
| CN | 107086668 A | * | 8/2017 |
| CN | 107086668 A | | 8/2017 |

* cited by examiner

CONTROL METHOD AND SYSTEM FOR DISTRIBUTION NETWORK WITH DISTRIBUTED MOBILE ENERGY STORAGE SYSTEMS

TECHNICAL FIELD

The present invention relates to the field of distribution network control, and in particular, to a control method and system for a distribution network with distributed mobile energy storage systems.

BACKGROUND

With the rapid economic development and the continuous improvement of people's living standards, the peak-to-valley load difference of the power system has increased year by year, while the maximum utilization rate has decreased year by year. A variety of factors, including seasonal and regional differences, also pose more complex and diverse demands on the power system. In addition, with the increasing proportion of renewable energy in electric energy, the inherent randomness, volatility, and uncertainty of renewable energy also put forward stricter requirements on the power system.

With its good charging and discharging performance, the energy storage system can effectively regulate power resources to meet demands, balance the power consumption difference between day and night and between different seasons, and reduce the difference between peak and valley load. The distributed mobile energy storage system is spatially flexible, which can effectively solve the instability and disorder of energy flows in the power system, and improve the safety and adaptability of the power system, the utilization of the power supply equipment, the reliability of power supply, and the power quality. However, in the existing distribution network that includes distributed mobile energy storage systems, the different distributed mobile energy storage systems are not effectively integrated into the distribution network and not sufficiently associated with each other. Particularly, there lacks cooperation between the distributed mobile energy storage systems far away from each other. As a result, the distributed mobile energy storage systems only function in a small area, the distribution network cannot manage the distributed mobile energy storage systems in a unified way, and the flexibility of the distribution network is low.

SUMMARY

In view of this, the present invention proposes a control method and system for a distribution network with distributed mobile energy storage systems, to manage all the distributed mobile energy storage systems together and improve the flexibility of the distribution network.

The present invention provides a control method for a distribution network with distributed mobile energy storage systems includes:

acquiring, by a sub-station coordination system, internal data of the distribution network, and sending the internal data to a master-station dispatching system;

receiving, by the master-station dispatching system, the internal data and obtaining external data;

generating, by the master-station dispatching system, a control instruction based on the internal data and the external data, and sending the control instruction to the sub-station coordination system; and performing, by the sub-station coordination system, unified coordinate control on the distributed mobile energy storage systems according to the control instruction.

Optionally, the acquiring, by a sub-station coordination system, internal data of the distribution network, and sending the internal data to a master-station dispatching system includes:

acquiring, by the sub-station coordination system, operating data of the corresponding distributed mobile energy storage systems and converters in the distribution network, where the internal data includes the operating data of the distributed mobile energy storage systems and the converters and interface data of the distribution network, and the operating data includes operating status and operating parameters; and storing, by the sub-station coordination system, the internal data and sending the internal data to the master-station dispatching system.

Optionally, the acquiring external data includes:

sending, by an external automation information system connected to the master-station dispatching system, the external data to the master-station dispatching system, where the external data includes operation management information of the distribution network.

Optionally, the generating, by the master-station dispatching system, a control instruction based on the internal data and the external data, and sending the control instruction to the sub-station coordination system includes:

using, by the master-station dispatching system, a model predictive control-based local regulation policy for the distribution network based on the internal data and the external data to determine a distribution requirement scenario of the distribution network, and generating different control instructions for the different distributed mobile energy storage systems based on the distribution requirement scenario; and sending, by the master-station dispatching system, the different control instructions to the sub-station coordination systems corresponding to the distributed mobile energy storage systems in the distribution network based on the interface data of the distribution network.

Optionally, the performing, by the sub-station coordination system, unified coordinate control on the distributed mobile energy storage systems according to the control instruction includes:

receiving, by the sub-station coordination system, the different control instructions corresponding to the distributed mobile energy storage systems; and controlling, by the sub-station coordination system, the on-off state, operating parameters, operating mode, and operating status of the corresponding distributed mobile energy storage systems according to the control instructions, where the operating status includes charging and discharging states of the distributed mobile energy storage systems.

The present invention further provides a control system for a distribution network with distributed mobile energy storage systems, including a master-station dispatching system and sub-station coordination systems, where the master-station dispatching system is deployed at the dispatching end of the distribution network, and configured to receive internal data sent by the sub-station coordination systems, obtain external data, generate control instructions based on the internal data and the external data, and send the control instructions to the sub-station coordination systems; and the sub-station coordination systems are deployed at the power user end of the distribution network, and configured to acquire the internal data of the distribution network, send the internal data to the master-station dispatching system, receive the control instructions sent by the master-station dispatching system, and perform unified coordinate control on the distributed mobile energy storage systems according to the control instructions.

The control method and system for a distribution network with distributed mobile energy storage systems implement the hierarchical control covering a master-station dispatching system, sub-station coordination systems, and the distributed mobile energy storage systems. The different distributed mobile energy storage systems in the distribution network are managed together based on the internal data acquired by the master-station dispatching system and the external data including the operation management information of the distribution network. This improves the flexibility of the distribution network.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

In order to make the objectives, technical solutions, and advantages of the present invention clearer and more comprehensible, the present invention is described in further detail below with reference to the embodiments and accompanying drawings.

It should be noted that the expressions "first", "second", and so on in the embodiments of the present invention are intended to distinguish between two different entities or parameters with the same name, and shall not be construed as any limitation to the embodiments of the present invention. No more clarification is made hereinafter.

The present invention provides a control method for a distribution network with distributed mobile energy storage systems.

Figure 1:
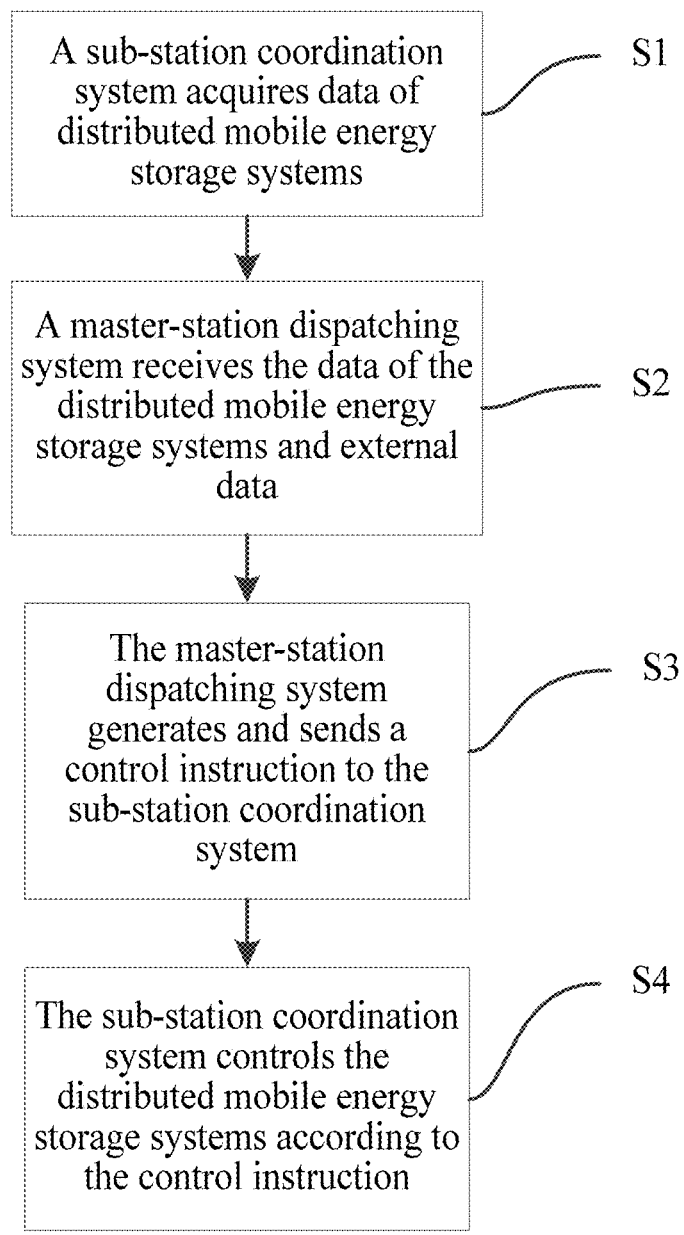
FIG. 1 is a schematic diagram of a control method for a distribution network with distributed mobile energy storage systems according to an embodiment of the present invention.

As shown in FIG. 1, the control method for a distribution network with distributed mobile energy storage systems according to some optional embodiments of the present invention includes the following steps:

S1: acquiring, by a sub-station coordination system, internal data of the distribution network, and sending the internal data to a master-station dispatching system;

S2: receiving, by the master-station dispatching system, the internal data and obtaining external data;

S3: generating, by the master-station dispatching system, a control instruction based on the internal data and the external data, and sending the control instruction to the sub-station coordination system;

S4: performing, by the sub-station coordination system, unified coordinate control on the distributed mobile energy storage systems according to the control instruction.

In the control method for a distribution network with distributed mobile energy storage systems according to some optional embodiments of the present invention, the acquiring, by a sub-station coordination system, internal data of the distribution network, and sending the internal data to a master-station dispatching system in S1 includes:

acquiring, by the sub-station coordination system, operating data of the corresponding distributed mobile energy storage systems and converters in the distribution network, where the internal data includes the operating data of the distributed mobile energy storage systems and the converters and interface data of the distribution network, and the operating data includes operating status and operating parameters; and storing, by the sub-station coordination system, the internal data and sending the internal data to the master-station dispatching system.

In the control method for a distribution network with distributed mobile energy storage systems according to some optional embodiments of the present invention, the obtaining external data includes:

sending, by an external automation information system connected to the master-station dispatching system, the external data to the master-station dispatching system, where the external data includes operation management information of the distribution network.

In the control method for a distribution network with distributed mobile energy storage systems according to some optional embodiments of the present invention, the generating, by the master-station dispatching system, a control instruction based on the internal data and the external data, and sending the control instruction to the sub-station coordination system in S3 includes:

using, by the master-station dispatching system, a model predictive control-based local regulation policy for the distribution network based on the internal data and the external data to determine a distribution requirement scenario of the distribution network, and generating different control instructions for the different distributed mobile energy storage systems based on the distribution requirement scenario; and sending, by the master-station dispatching system, the different control instructions to the sub-station coordination systems corresponding to the distributed mobile energy storage systems in the distribution network based on the interface data of the distribution network.

In the control method for a distribution network with distributed mobile energy storage systems according to some optional embodiments of the present invention, the performing, by the sub-station coordination system, unified coordinate control on the distributed mobile energy storage systems according to the control instruction in S4 includes:

receiving, by the sub-station coordination system, the different control instructions corresponding to the distributed mobile energy storage systems; and controlling, by the sub-station coordination system, the on-off state, operating parameters, operating mode, and operating status of the corresponding distributed mobile energy storage systems according to the control instructions, where the operating status includes charging and discharging states of the distributed mobile energy storage systems.

The present invention also provides a control system for a distribution network with distributed mobile energy storage systems.

Figure 2:
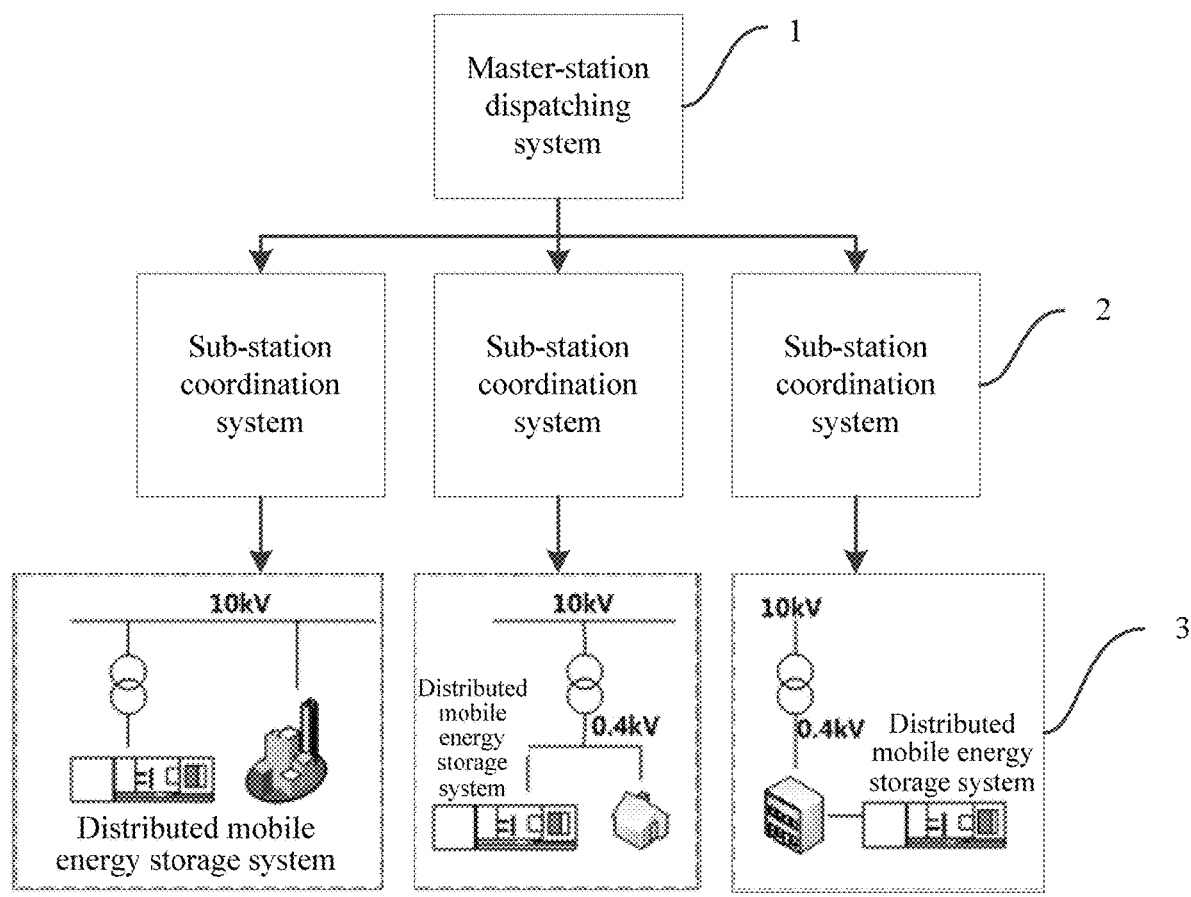
FIG. 2 is a schematic diagram of a control system for a distribution network with distributed mobile energy storage systems according to an embodiment of the present invention.

As shown in FIG. 2, the control system for a distribution network with distributed mobile energy storage systems according to some optional embodiments of the present invention includes a master-station dispatching system 1 and sub-station coordination systems 2.

The master-station dispatching system 1 is deployed at the dispatching end of the distribution network, and configured to receive internal data sent by the sub-station coordination systems 2, obtain external data, generate control instructions based on the internal data and the external data, and send the control instructions to the sub-station coordination systems 2.

The master-station dispatching system 1 is connected to an external automation information system to receive the external data sent by external automation information system.

The master-station dispatching system 1 uses a model predictive control-based local regulation policy for the distribution network based on the internal data and the external data to determine a distribution requirement scenario of the distribution network, and generates different control instructions for the different distributed mobile energy storage systems based on the distribution requirement scenario.

The sub-station coordination systems 2 are deployed at the power user end of the distribution network, and configured to acquire the internal data of the distribution network, send the internal data to the master-station dispatching system 1, receive the control instructions sent by the master-station dispatching system 1, and perform unified coordinate control on the distributed mobile energy storage systems 3 according to the control instructions.

The sub-station coordination systems 2 are correspondingly connected to different distributed mobile energy storage systems 3. The different distributed mobile energy storage systems 3 are applied to power supply systems for different power users, where the power supply systems for different power users include a distribution system for large power users, a distribution system for medium power users, and a distribution system for small power users.

The master-station dispatching system 1 is connected to the external automation information system, and obtains the external data through the external automation information system. The external data includes operation management information of the distribution network, and the operation management information of the distribution network includes power supply systems for different power users to which the distributed mobile energy storage systems 3 corresponding to the sub-station coordination systems 2 belong, user power load in the power supply systems, special power consumers of the power supply systems, and special power supply tasks of the power supply systems at different time.

The information about the power supply systems for different power users refers to the distribution system for large power users, the distribution system for medium power users, the distribution system for small power users, and various power parameters of the three types of distribution systems.

The information about the user power load in the power supply systems includes the power load of the power supply systems at different time and space. The daily power load of the power supply systems changes over time. The power load also varies with regions and seasons.

The special power consumer information includes the special power consumers in the power supply systems. For example, temporary construction projects and charging facilities of electric vehicles are special power consumers for the power supply system.

The control method and system for a distribution network with distributed mobile energy storage systems acquire and process the internal data and external data of the distribution network, and perform unified coordinate management on all the distributed mobile energy storage systems in the distribution network based on application scenarios of the distribution network. This allows the distributed mobile energy storage systems to fully smooth new energy generation fluctuations, implement peak cut, facilitate grid auxiliary services, and adjust reactive power to improve the power quality, thereby improving the flexibility of the distribution network, and realizing high-penetration, distributed power consumption and large-scale energy alternatives for reliable and economical power supply.

Those of ordinary skill in the art should understand that the discussion of any of the above embodiments is only exemplary, and is not intended to imply that the scope of the present disclosure (including the claims) is limited to these embodiments. Under the idea of the present invention, the above embodiments or the technical features in different embodiments can also be combined, the steps can be implemented in any order, and many other changes in different aspects of the present invention are included, which are not provided in the details for brevity.

In addition, to simplify the description and discussion without making the present invention difficult to understand, the well-known power/ground connections to integrated circuit (IC) chips and other components may or may not be shown in the accompanying drawings. For ease of understanding, the devices may be shown in the form of block diagrams. In addition, the details about the implementations of the devices in the block diagrams are highly dependent on the platform on which the present invention will be implemented (that is, these details should be fully understandable to those skilled in the art). When specific details (for example, a circuit) are provided to describe exemplary embodiments of the present invention, it is obvious that those skilled in the art can implement the present invention without these specific details or in case of any changes to these specific details. Therefore, these descriptions should be considered illustrative rather than restrictive.

Although the present invention has been described with reference to specific embodiments of the present invention, many substitutions, modifications, and variations of these embodiments will be obvious to those of ordinary skill in the art based on the foregoing description. For example, other memory architectures, for example, dynamic RAM (DRAM), can be used in the discussed embodiments.

The embodiments of the present invention are intended to cover all such substitutions, modifications, and variations that fall within the broad scope of the appended claims. Any modifications, equivalent substitutions, improvements, etc. made within the spirit and scope of the present invention should be included within the protection scope of the present invention.

The invention claimed is:

1. A control method for a distribution network with distributed mobile energy storage systems, comprising:

acquiring, by a sub-station coordination system, internal data of the distribution network, and sending the internal data to a master-station dispatching system;

receiving, by the master-station dispatching system, the internal data and obtaining external data;

generating, by the master-station dispatching system, a control instruction based on the internal data and the external data, and sending the control instruction to the sub-station coordination system; and performing, by the sub-station coordination system, unified coordinate control on the distributed mobile energy storage systems according to the control instruction;

wherein the acquiring, by a sub-station coordination system, internal data of the distribution network, and sending the internal data to a master-station dispatching system comprises:

acquiring, by the sub-station coordination system, operating data of the corresponding distributed mobile energy storage systems and converters in the distribution network, wherein the internal data comprises the operating data of the distributed mobile energy storage systems and the converters and interface data of the distribution network, and the operating data comprises operating status and operating parameters; and storing, by the sub-station coordination system, the internal data and sending the internal data to the master-station dispatching system.

2. The control method for a distribution network with distributed mobile energy storage systems according to claim 1, wherein the acquiring external data comprises:

sending, by an external automation information system connected to the master-station dispatching system, the external data to the master-station dispatching system, wherein the external data comprises operation management information of the distribution network.

3. The control method for a distribution network with distributed mobile energy storage systems according to claim 1, wherein the generating, by the master-station dispatching system, a control instruction based on the internal data and the external data, and sending the control instruction to the sub-station coordination system comprises:

using, by the master-station dispatching system, a model predictive control-based local regulation policy for the distribution network based on the internal data and the external data to determine a distribution requirement scenario of the distribution network, and generating different control instructions for the different distributed mobile energy storage systems based on the distribution requirement scenario; and sending, by the master-station dispatching system, the different control instructions to the sub-station coordination systems corresponding to the distributed mobile energy storage systems in the distribution network based on the interface data of the distribution network of the internal data.

4. The control method for a distribution network with distributed mobile energy storage systems according to claim 3, wherein the performing, by the sub-station coordination system, unified coordinate control on the distributed mobile energy storage systems according to the control instruction comprises:

receiving, by the sub-station coordination system, the different control instructions corresponding to the distributed mobile energy storage systems; and controlling, by the sub-station coordination system, the on-off state, operating parameters, operating mode, and operating status of the corresponding distributed mobile energy storage systems according to the control instructions, wherein the operating status comprises charging and discharging states of the distributed mobile energy storage systems.

5. A control system for a distribution network with distributed mobile energy storage systems, comprising a master-station dispatching system and sub-station coordination systems, wherein the master-station dispatching system is deployed at the dispatching end of the distribution network, and configured to receive internal data sent by the sub-station coordination systems, obtain external data, generate control instructions based on the internal data and the external data, and send the control instructions to the sub-station coordination systems; and the sub-station coordination systems are deployed at the power user end of the distribution network, and configured to acquire the internal data of the distribution network, send the internal data to the master-station dispatching system, receive the control instructions sent by the master-station dispatching system, and perform unified coordinate control on the distributed mobile energy storage systems according to the control instruction;

wherein the internal data of the distribution network is acquired and sent to the master-station dispatching system by:

acquiring, by the sub-station coordination system, operating data of the corresponding distributed mobile energy storage systems and converters in the distribution network, the internal data comprising the operating data of the distributed mobile energy storage systems and the converters and interface data of the distribution network, and the operating data comprising operating status and operating parameters; and storing, by the sub-station coordination system, the internal data and sending the internal data to the master-station dispatching system.

* * * * *